(12) United States Patent
Mead et al.

(10) Patent No.: US 10,961,159 B2
(45) Date of Patent: Mar. 30, 2021

(54) CERAMIC MATERIAL, COMPONENT, AND METHOD FOR PRODUCING THE COMPONENT

(71) Applicant: TDK Electronics AG, Munich (DE)

(72) Inventors: Christl Lisa Mead, St. Martin Island (AT); Cornelia Treul, Deutschlandsberg (AT)

(73) Assignee: TDK Electronics AG, Munich (DE)

( * ) Notice: Subject to any disclaimer, the term of this patent is extended or adjusted under 35 U.S.C. 154(b) by 0 days.

(21) Appl. No.: 16/326,360

(22) PCT Filed: Aug. 21, 2017

(86) PCT No.: PCT/EP2017/071053
§ 371 (c)(1),
(2) Date: Feb. 18, 2019

(87) PCT Pub. No.: WO2018/036976
PCT Pub. Date: Mar. 1, 2018

(65) Prior Publication Data
US 2020/0131091 A1 Apr. 30, 2020

(30) Foreign Application Priority Data
Aug. 23, 2016 (DE) .................. 10 2016 115 642

(51) Int. Cl.
*C04B 35/626* (2006.01)
*C01G 53/00* (2006.01)
(Continued)

(52) U.S. Cl.
CPC ............ *C04B 35/626* (2013.01); *C01G 53/44* (2013.01); *C04B 35/016* (2013.01); *G01K 7/22* (2013.01);
(Continued)

(58) Field of Classification Search
CPC ................ C04B 35/626; C04B 35/016; C04B 2235/3275; C04B 2235/3279;
(Continued)

(56) References Cited

U.S. PATENT DOCUMENTS

| 4,840,925 | A | 6/1989 | Rousset et al. |
| 8,228,160 | B2 * | 7/2012 | Kloiber ............... G01K 7/223 |
| | | | 338/22 R |

(Continued)

FOREIGN PATENT DOCUMENTS

| CN | 105552322 A | 5/2016 |
| DE | 10150248 A1 | 6/2002 |

(Continued)

OTHER PUBLICATIONS

Zhang et al. Preparation and Characterization of NTC NiMn2O4—La1-xCaxMnO3 (0<x<0.3) Composite Ceramics. Advanced Materials Research vol. 716, 2013. pp. 78-83.*
(Continued)

*Primary Examiner* — Noah S Wiese
(74) *Attorney, Agent, or Firm* — Slater Matsil, LLP (57) ABSTRACT

A ceramic material, a component, and a method for producing a component are disclosed. In an embodiment a ceramic material includes a structure based on a system selected from the group consisting of Ni—Co—Mn—O, Ni—Mn—O and Co—Mn—O, and at least one dopant selected from lanthanides, wherein the ceramic material has a negative temperature coefficient of an electrical resistance.

20 Claims, 5 Drawing Sheets

(51) Int. Cl.
*C04B 35/01* (2006.01)
*G01K 7/22* (2006.01)
*H01C 7/04* (2006.01)

(52) U.S. Cl.
CPC ...... *H01C 7/043* (2013.01); *C04B 2235/3206* (2013.01); *C04B 2235/3208* (2013.01); *C04B 2235/3213* (2013.01); *C04B 2235/3217* (2013.01); *C04B 2235/3275* (2013.01); *C04B 2235/3279* (2013.01); *C04B 2235/3281* (2013.01); *C04B 2235/6567* (2013.01); *C04B 2235/763* (2013.01); *C04B 2235/9607* (2013.01)

(58) Field of Classification Search
CPC ...... C04B 2235/763; C04B 2235/3224; C01G 53/44; C01P 2002/32
See application file for complete search history.

(56) References Cited

U.S. PATENT DOCUMENTS 10,074,466 B2 * 9/2018 Schweinzger ......... C04B 35/44
2002/0074657 A1 6/2002 Nakayama et al.

FOREIGN PATENT DOCUMENTS

| DE | 102014102042 A1 | | 8/2015 | |
|---|---|---|---|---|
| EP | 0609776 A1 | | 8/1994 | |
| EP | 2073221 A1 | | 6/2009 | |
| JP | H06263518 A | | 9/1994 | |
| JP | 2002121071 A | | 4/2002 | |
| WO | 2015124421 A1 | | 8/2015 | |
| WO | WO2015/124421 | * | 8/2015 | ............ H01C 7/046 |

OTHER PUBLICATIONS

Ghosh et al. Transition-element doping effects in La0.7Ca0.3MnO3. Physical Review B. vol. 59, No. 1. Jan. 1999. pp. 533-537.*
Gosh, K. et al., "Transition-Element Doping Effects in La0.7Ca0.3MnO3," Physical Review B, vol. 59, No. 1, Jan. 1, 1999, 5 pages.
Muralidharan, M.N. et al., "Effect of Cu and Fe Addition on Electrical Properties of Ni—Mn—Co—O NTC Thermistor Compositions," Ceramics International, 38, SciVers ScienceDirect, Elsevier, Dec. 2012, 6 pages.
Zhang, H. et al., "Preparation and Characterization of NTC NiMn2O4—La1—xCaxMnO3 (0=x=0.3) Composite Ceramics," Advanced Materials Research, vol. 716, ISSN: 1662-8985, Jan. 2013, 6 pages.

* cited by examiner

CERAMIC MATERIAL, COMPONENT, AND METHOD FOR PRODUCING THE COMPONENT

This patent application is a national phase filing under section 371 of PCT/EP2017/071053, filed Aug. 21, 2017, which claims the priority of German patent application 102016115642.6, filed Aug. 23, 2016, each of which is incorporated herein by reference in its entirety.

TECHNICAL FIELD

The application relates to a ceramic material with a negative temperature coefficient, a component comprising the ceramic material, and a method for producing the component.

BACKGROUND

Temperatures for monitoring and control in different applications are predominantly measured using ceramic negative temperature coefficient (NTC) thermistor elements, silicon temperature sensors (KTY), platinum resistance temperature detectors (PRTD), or thermocouples (TC). Because of their low production costs, NTC thermistors based, for example, on spinel structures are the most widely used. A further advantage over thermocouples and metallic resistance elements such as, e.g., platinum elements is that they show pronounced negative resistance temperature characteristics.

Because of the continuously increasing requirements for temperature detectors with respect to their electrical properties and miniaturization of component geometry, ceramic materials having high B-values and low resistivity values are required. For the production of sensors combining low real resistance values with a steep characteristic curve, either trimmed discs or chips having relatively large component geometries have conventionally been used, with a volume of up to 2.6 cm$^3$. As miniaturization requirements have become increasingly stringent, it has become necessary to make the component dimensions of NTC ceramics significantly smaller. So far, ceramic compositions were doped, for example, with copper oxide in order to allow resistivity values of less than 200Ωcm to be achieved. At the same time, however, the B value was reduced to less than 3000 K, and drift behavior was increased from approximately 2% to 5 to 10%.

SUMMARY OF THE INVENTION

Embodiments provide a ceramic material with improved properties. Further embodiments provide a component with improved properties. Yet other embodiments provide a method for producing a component with improved properties.

Embodiments provide a ceramic material with a negative temperature coefficient of the electrical resistance. It has a structure that is based on a system selected from Ni—Co—Mn—O, Ni—Mn—O, and Co—Mn—O. The ceramic material further comprises at least one dopant selected from the group of the lanthanides. Here, Ni—Co—Mn—O is synonymous with Ni—Mn—Co—O, and Co—Mn—O is synonymous with Mn—Co—O.

Here and in the following, a ceramic material with a negative temperature coefficient (NTC) of the electrical resistance is here and in the following understood to refer to a material that conducts electric current better at high temperatures than at low temperatures. Such materials can also be referred to as thermistors.

The statement that the ceramic material is based on a system that is selected from Ni—Co—Mn—O, Ni—Mn—O, and Co—Mn—O is to be understood as meaning that the ceramic material has at least Ni, Co, Mn and O, or Ni, Mn and O, or Mn, Co and O respectively, wherein the individual elements can be present in the ceramic material in different amounts, and wherein the respective system can comprise further elements. Each of the elements of a system forms a particular structure in the lattice of which the at least one dopant can be incorporated.

Such a ceramic material shows decoupled electrical properties. This means that with the ceramic material, at least in a specified range, a high B value can be realized with simultaneously low resistivity ρ. By contrast, in conventional NTC ceramics, there is a linear relationship between the resistivity p and the B value. For example, a conventional NTC component, with a B value of about 4000 K, has an resistivity p of approximately 2500Ωcm. By contrast, with a ceramic material according to the invention, one can achieve a high B value of up to 4000 K with simultaneously low resistivity values of 200Ωcm to 500Ωcm.

The decoupling of the electrical properties can be achieved by addition of the at least one dopant, which is selected from the lanthanides. The low resistivity values allow miniaturization of components containing the ceramic material by a factor of at least 20 compared to conventional components with NTC ceramics.

By means of this decoupling of the electrical properties of the ceramic material according to the invention, one can thus achieve high B-values with low resistivity values, and at the same time, such ceramic materials show high long-term stability, with drift values of less than 0.5% over a period of at least 1000 hours in a temperature range of, e.g., 70° C. to 300° C.

According to an embodiment, the dopant is selected from praseodymium (Pr), neodymium (Nd), and combinations thereof. With these dopants, the above-described decoupling of the electrical properties can be achieved in a particularly favorable manner.

According to an embodiment, the dopant is contained in the ceramic material in an amount of up to 10 mol % inclusive. The amount of the dopant added to the ceramic material can affect the slope of the characteristic curves.

According to an embodiment, the ceramic material can have a system that further comprises at least one element selected from Al, Fe, Cu, Zn, Ca, Zr, Ti, Mg, Sr and combinations thereof. According to a further embodiment, the ceramic material has a spinel structure.

According to an embodiment, the spinel structure has the general formula $AB_2O_4$, where:
  A is selected from Ni, Co, Mn, Mg, Sr, Zn, Ca, Zr, Cu and combinations thereof,
  B is selected from Mn, Co, Al, Fe, Ti and combinations thereof,
  A comprises at least Ni and B comprises at least Mn, or A comprises at least Ni and B comprises at least Mn and Co, or A comprises at least Mn or Co and B comprises at least Co or Mn.

Here and in the following, the general formula of the spinel structure is to be understood as a basic formula with an A position and a B position that do not have to reflect the exact stoichiometric ratios of the individual components of the ceramic material.

According to the general formula, A corresponds to one or more divalent elements. B corresponds to one or more elements that may have mixed valences, such as di-, tri, or tetravalent. The general formula can therefore also be expressed, e.g., as $A_{1-x}^{2+} B_x^{2+} (A_x^{2+} B_{2-2x}^{3+} B_x^{4+})O_4$, where the index x can be selected from the range of 0 to 1. For x=o, the general formula is $A^{2+} B_2^{3+} O_4$.

In any case, the spinel structure comprises Ni and Mn, or Ni, Mn and Co, or Mn and Co.

Moreover, the dopant may be disposed at the B position of the spinel structure.

The spinel structure can further be selected from $NiMn_2O_4$, $Ni^{2+} Mn^{3+} Co^{3+} O_4$, $MnCo_2O_4$, and $CoMn_2O_4$. Based on such a structure, for example, the ceramic material can thus be selected from $Co_{1.5-0.5a}Mn_{1.5-0.5a}Pr_aO_4$, $CO_{1.8-0.5a}Mn_{1.2-0.5a}Pr_aO_4$, and $Ni_{0.97-0.33a}Mn_{1.2-0.33a}Fe_{0.82-0.33a}Pr_aO_4$. In each case, $0< a \le 0.3$.

The basic formulation of the ceramic material is selected in accordance with the desired course of the B value. The value of the resistivity p can then be adjusted by addition of the dopant to the respective basic formulation.

Embodiments further provide a component that has a ceramic base element comprising a ceramic material as described above. All of the features indicated with respect to the ceramic material thus also apply to the component, and vice versa.

Moreover, the component comprises at least two electrodes that are disposed on the ceramic base element. The component can further comprise an encapsulation that fully surrounded at least the ceramic base element, more particularly the ceramic base element and the electrodes. The electrodes can be electrically contacted with connecting wires, wherein the connecting wires can also be surrounded by the encapsulation.

According to an embodiment, the component is a temperature sensor. This makes it possible to realize a temperature sensor (NTC thermistor) that can have a reduced component size, as it comprises the ceramic material with decoupled electrical properties.

According to an embodiment, the ceramic base element has a volume selected from the range of 0.03 cm³ inclusive to 0.23 cm³ inclusive. This makes it possible to realize substantially smaller ceramic base elements while retaining the same real resistance values $R_{25}$ compared to previous components. Because of the resulting reduction in size of the component, for example, the temperature sensor, more of the ceramic base elements can be produced from the same basic amount of ceramic material, which provides a cost advantage, and if applicable can make up for increased costs of raw materials.

According to a further embodiment, the ceramic base element can have a real resistance $R_{25}$ that is selected from a range of 2000Ω to 3000Ω. Moreover, the ceramic base element can have a B value selected from the range of 3500 K to 4300 K. In particular, the B value can be 4000 K.

Moreover, the component can have an encapsulation. According to an embodiment, the encapsulation of the component can comprise glass or a polymer. This provides the component with sufficient mechanical stability and protects it from external influences. Moreover, corrosion by aggressive media can be prevented. The encapsulation can be disposed in the form of a coating on at least the ceramic base element.

Yet other embodiments provide a method for producing a component having a base element comprising a ceramic material as described above. All of the features disclosed with respect to the ceramic material and the component thus also apply to the method, and vice versa.

The method includes the steps of production of a powder containing starting materials of the ceramic material, production of a film from the powder, production of substrates containing the ceramic material from the film, and singulation of the substrates.

The step "production of a powder containing starting materials of the ceramic material" can, for example, comprise the substeps of initial weighing of the starting materials, their first wet grinding, first drying, first sieving, calcining, second wet grinding, second drying and second sieving. Production of the powder can be carried out by the mixed oxide method.

In producing the powder, the starting materials of the at least one dopant can be added, for example, in the form of oxides, hydroxides, carbonates, nitrates, sulfates and/or oxalates, to the other starting materials. The other starting materials can also be oxides, hydroxides, carbonates, nitrates, sulfates and/or oxalates, depending on the composition of the ceramic material, of the elements Ni, Co, Mn, Al, Fe, Cu, Zn, Ca, Zr, Ti, Mg, or Sr.

By addition of the dopants to the ceramic material, a reduction in the resistivity p is achieved, wherein the B value is not affected to the same extent. By adding lanthanides as dopants, the typical linear B-ρ behavior is at least partially decoupled.

The method step "production of a film from the powder" can comprise the substeps of initial weighing of organic components, the powder, and solvents, slag treatment, grinding, degassing, and calendering.

The step "production of substrates containing the ceramic material from the film" can comprise the substeps of stacking, pressing and cutting of the film, decarburizing, sintering, lapping, heat treating, metallizing for applying the at least two electrodes, and electrical premeasurement. Finally, the component is produced by singulation of the substrates.

The substeps of sintering, heat treating and metallizing are temperature processes that can affect the slope of the characteristic curves of the ceramic material or the component containing the ceramic material. The sintering can take place at a temperature selected from the range of 1100° C. inclusive to 1300° C. inclusive. The heat treating can take place at a temperature selected from the range of 900° C. inclusive to 1100° C. inclusive. The dwell time during sintering can be selected from the range of 2 h inclusive to 8 h inclusive, and the dwell time during heat treating can be selected from the range of 1 h inclusive to 72 h inclusive. The metallizing during which the electrodes are baked can take place at a temperature selected from the range of 700° C. inclusive to 900° C. inclusive, with a dwell time ranging from 10 min inclusive to 60 min inclusive.

It is therefore possible by means of this method to produce a component of small size, such as a temperature sensor, in an economical and material-saving manner, the ceramic base element of which shows, at least in some areas, decoupled electrical properties.

BRIEF DESCRIPTION OF THE DRAWINGS

In the following, the ceramic material and component described here will be explained in greater detail by means of exemplary embodiments and accompanying figures.

Elements in the figures that are identical, similar, or have the same effect are indicated with the same reference numbers. The figures and the size relationships among the elements shown in the figures are not to be considered true to scale. Rather, the size of individual elements may be exaggerated in order to make them clearer and/or easier to understand.

DETAILED DESCRIPTION OF ILLUSTRATIVE EMBODIMENTS

Figure 1:
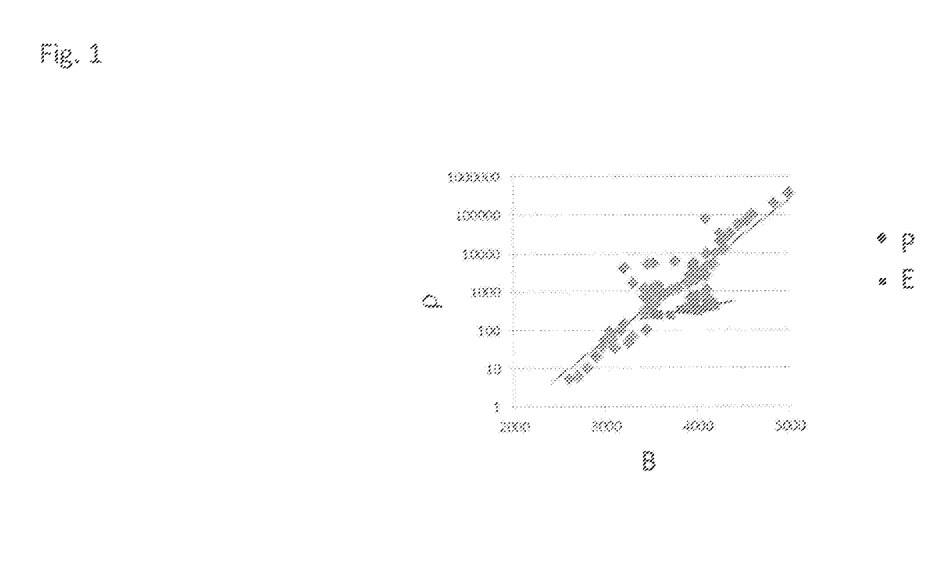
FIG. 1 shows the relationship between resistivity p and the B value by means of exemplary embodiments.

FIG. 1 shows the relationship between the resistivity ρ and the B value for conventional undoped NTC ceramics (P) based on the systems $NiMnCoO_4$ and $NiMn_2O_4$ and for the exemplary embodiments of doped ceramic materials $Co_{1.5-0.5a}Mn_{1.5-0.5a}Pr_aO_4$, $Co_{1.8-0.5a}Mn_{1.2-0.5a}Pr_aO_4$, and $Ni_{0.97-0.33a}Mn_{1.2-0.33a}Fe_{0.82-0.33a}Pr_aO_4$, where $0<a\leq0.3$ (E). The x axis shows the B value in K, and the y axis shows the resistivity ρ in Ωcm. The diamonds P indicate the values for conventional NTC ceramics, and the squares E indicate the values for the exemplary embodiments of the ceramic material.

It can be seen from FIG. 1 that for the ceramic materials doped with a lanthanide (E), resistivity values ρ of 200Ωcm to 500Ωcm can be set over a B value range of 3500 K to 4300 K. In the same B value range, the resistivity values ρ for conventional NTC ceramics (P) are between 500Ωcm and 20000Ωcm.

The low resistivity values of the lanthanide-doped ceramic materials are advantageous in that in contrast to the NTC ceramic compositions of prior art, substantially smaller component shapes can be realized with the same real resistance values. Because of the resulting reduction in component sizes, more NTC ceramic bodies comprising the ceramic material can be produced from the same basic amount of ceramic material. This provides a cost advantage and makes up for higher raw material costs.

Figure 2A:
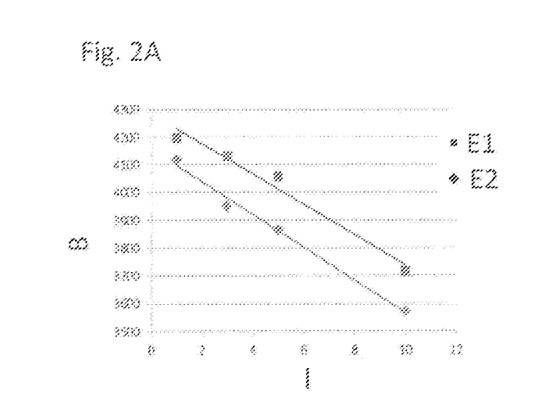
FIGS. 2A and 2B show the effect of the amount of dopant added 1 in accordance with the basic formulation of the ceramic material on the B value and the resistivity p by means of exemplary embodiments.
Figure 2B:
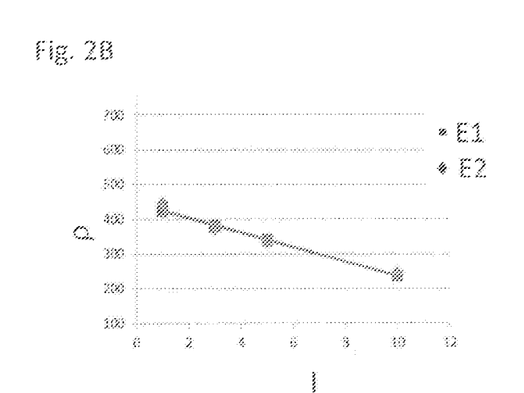

FIGS. 2A and 2B show the effect of the amount of dopant added 1, depending on the basic formulation of the ceramic material, on the B value (FIG. 2A) and the ρ value (FIG. 2B). The x axis shows the respective amount of 1 added in mol %. The y axis of FIG. 2A represents the B value in K, and the y axis of FIG. 2B shows the resistivity ρ in SΩcm.

The two basic formulations are indicated by squares $E_1$ (basic formulation 1) and diamonds $E_2$ (basic formulation 2) respectively. The term basic formulation is to be understood as referring to the respective composition of the ceramic material to which different amounts of the dopant 1 are added. Basic formulation $E_1$ is $Co_{1.8-0.5a}Mn_{1.5-0.5a}Pr_aO_4$, where $0<a\leq0.3$, and basic formulation $E_2$ is $Co_{1.8-0.5a}Mn_{1.2-0.5a}Pr_aO_4$, where $0<a\leq0.3$.

It can be clearly seen from FIGS. 2A and 2B that the B values can be modified by selecting the basic formulation $E_1$ or $E_2$ to which the dopants are added (FIG. 2A), wherein at the same time, the resistivity ρ remains independent of the basic formulation (FIG. 2B).

Figure 3A:
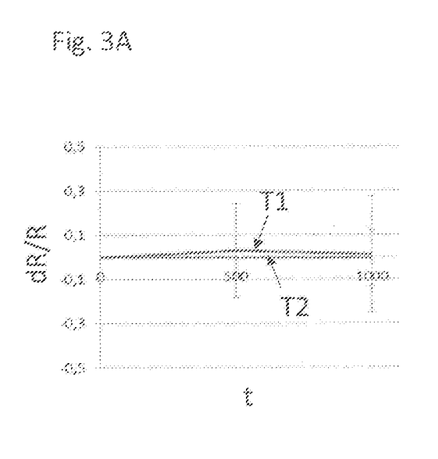
FIGS. 3A to 3C show the drift behavior of the ceramic material under various conditions.
Figure 3B:
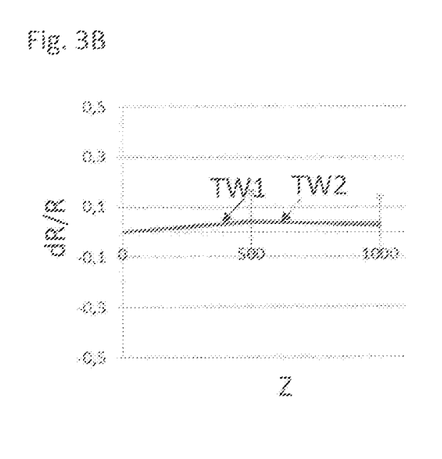
Figure 3C:
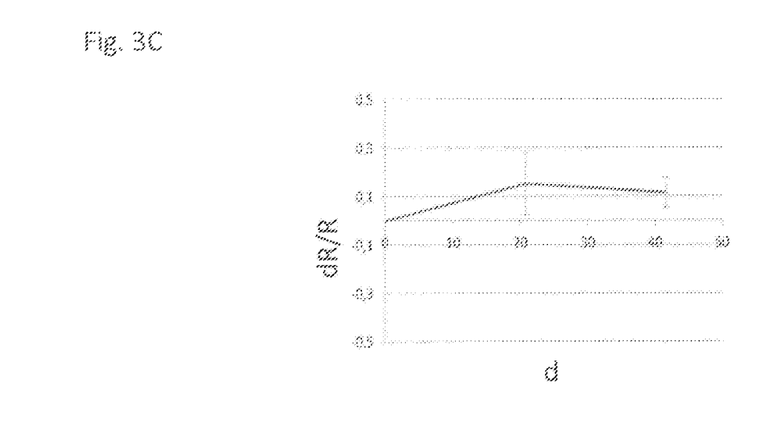

FIGS. 3A to 3C show the drift behavior of the ceramic material by means of an exemplary embodiment under different conditions. The drift behavior is determined by means of glass-encapsulated NTC temperature detectors containing the lanthanide-doped ceramic material. The lanthanide-doped ceramic material has a structure based on the system Ni—Co—Mn—O, Ni—Mn—O, or Co—Mn—O. The systems can optionally also comprise Al, Fe, Cu, Zn, Ca, Zr, Ti, Mg, Sr and combinations thereof, and the system has a spinel structure. The ceramic material has a dopant concentration of up to 10 mol %. The dopant is preferably Pr, Nd, or combinations thereof. For example, it can be $Co_{1.5-0.5a}Mn_{1.5-0.5a}Pr_aO_4$, $Co_{1.8-0.5a}Mn_{1.2-0.5a}Pr_aO_4$, or $Ni_{0.97-0.33a}Mn_{1.21-0.33a}Fe_{0.82-0.33a}Pr_aO_4$, where $0<a\leq0.3$ in each case.

FIG. 3A shows the drift behavior dR/R in % relative to the time t in hours h. $T_1$ shows the behavior of the ceramic material under a first temperature storage condition in dry heat at 155° C., and $T_2$ shows the behavior at a second temperature storage condition in dry heat at 300° C. Under both temperature storage conditions $T_1$ and $T_2$, the ceramic material shows a quite minimal drift behavior of less than 0.5%, even after 1000 hours.

FIG. 3B shows the drift behavior dR/R in % with a rapid temperature change. The x axis in FIG. 3B shows the number of cycles Z of the temperature change. $TW_1$ shows the behavior with a rapid temperature change (first temperature change condition) from −55° C. to 155° C., and $TW_2$ shows the behavior with a rapid temperature change (second temperature change condition) from −55° C. to 200° C. Under both condition $TW_1$ and condition $TW_2$, no change in resistance R can be seen.

FIG. 3C shows the effect of storage in moist heat on the drift behavior dR/R. This is again indicated in % on the y axis. The x axis shows the number of days d. Storage is carried out at a temperature of 85° C. and at 85% relative humidity. Under these conditions as well, the observed drift behavior is below 0.5%.

Figure 4A:
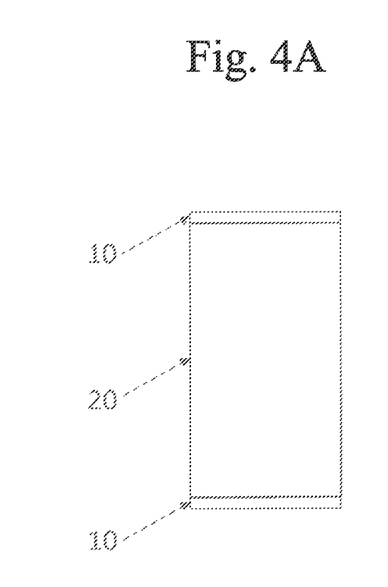
FIG. 4A shows a schematic side view of a conventional component.
Figure 4B:
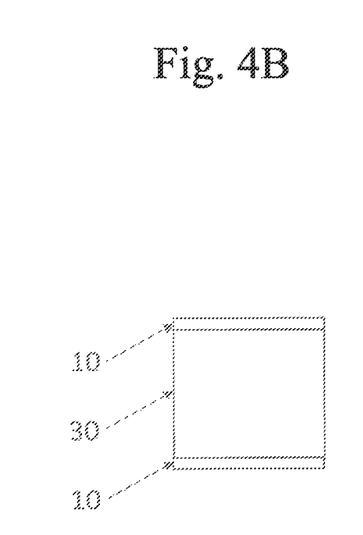
FIG. 4B shows an exemplary embodiment of a component.

FIG. 4A shows a schematic side view of a conventional component compared to an exemplary embodiment of a component shown in FIG. 4B. Both components comprise electrodes 10. The conventional component I further comprises the ceramic base element 20, which has a volume of 1.8 to 3.4 $cm^3$. By contrast, the ceramic base element 30 of the exemplary embodiment of the component II has a volume of 0.03 to 0.23 $cm^3$. Both components have a resistance $R_{25}$ of 2200Ω and a B value of 3500 to 4300 K. The component I shows an resistivity ρ of 1500 to 3000Ωcm, and that of component II is 200 to 500Ωcm. Components I and II can further comprise encapsulations, e.g., of glass or a polymer (not shown here).

The ceramic base element 30 of the component II comprises a lanthanide-doped ceramic material having a structure based on the system Ni—Co—Mn—O, Ni—Mn—O, or Co—Mn—O. The systems can optionally also comprise Al, Fe, Cu, Zn, Ca, Zr, Ti, Mg, Sr and combinations thereof, and the system has a spinel structure. The ceramic material has a dopant concentration of up to 10 mol %. The dopant is preferably Pr, Nd or combinations thereof. For example, the ceramic material is $Co_{1.5-0.5a}Mn_{1.5-0.5a}Pr_aO_4$, $Co_{1.8-0.5a}Mn_{1.2-0.5a}Pr_aO_4$, or $Ni_{0.97-0.33a}Mn_{1.21-0.33a}Fe_{0.82-0.33a}Pr_aO_4$, with $0<a\leq0.3$ in each case.

It can thus be shown that by selecting the ceramic material, the component size can be dramatically reduced, and at the same time, high B values combined with low resistivity values can be realized.

The invention is not limited to the description by means of the exemplary embodiments. Rather, the invention comprises each new feature and each combination of features that in particular contain(s) each combination of features in the patent claims, even if this feature or this combination is/are not explicitly mentioned in the patent claims or examples.

The invention claimed is:

1. A ceramic material comprising:
   a structure based on a system selected from the group consisting of Ni—Co—Mn—O, Ni—Mn—O, and Co—Mn—O; and
   at least one dopant selected from lanthanides,
   wherein the dopant is selected from the group consisting of Pr, Nd, and combinations thereof, and
   wherein the ceramic material has a negative temperature coefficient of an electrical resistance.

2. The ceramic material according to claim 1, wherein the dopant is contained in the ceramic material in an amount of up to and including 10 mol %.

3. The ceramic material according to claim 1, wherein the system further contains at least one element selected from Al, Fe, Cu, Zn, Ca, Zr, Ti, Mg, Sr and combinations thereof.

4. The ceramic material according to claim 1, wherein the ceramic material has a spinel structure.

5. The ceramic material according to claim 4,
   wherein the spinel structure has the general formula $AB_2O_4$,
   wherein A is selected from the group consisting of Ni, Co, Mn, Mg, Sr, Zn, Ca, Zr, Cu and combinations thereof,
   wherein B is selected from the group consisting of Mn, Co, Al, Fe, Ti and combinations thereof, and
   wherein A comprises at least Ni and B comprises at least Mn, or A comprises at least Ni and B comprises at least Mn and Co, or A comprises at least Mn or Co and B comprises at least Co or Mn.

6. The ceramic material according to claim 5, wherein the dopant is disposed at a B position of the spinel structure.

7. The ceramic material according to claim 5, wherein the spinel structure is selected from the group consisting of $NiMn_2O_4$, $Ni^{2+}Mn^{3+}Co^{3+}O_4$, $MnCo_2O_4$, and $CoMn_2O_4$.

8. A component comprising:
   a ceramic base element comprising a ceramic material according to claim 1; and
   at least two electrodes disposed on the ceramic base element.

9. The component according to claim 8, wherein the component is a temperature sensor.

10. The component according to claim 8, wherein the ceramic base element has a volume selected from a range of 0.03 $cm^3$ inclusive to 0.23 $cm^3$ inclusive.

11. The component according to claim 8, wherein the ceramic base element has a resistance $R_{25}$ selected from a range of 2000Ω to 3000Ω and a B value selected from a range of 3500 K to 4300 K.

12. The component according to claim 8, further comprising an encapsulation, wherein the encapsulation comprises glass or a polymer.

13. A method for producing the component according to claim 8, the method comprising:
   producing a powder containing starting materials of the ceramic material;
   producing a film from the powder;
   producing substrates containing the ceramic material from the film; and
   singulating the substrates.

14. The method according to claim 13, further comprising adding further starting materials of the at least one dopant in form of oxides, hydroxides, carbonates, nitrates, sulfates and/or oxalates to the starting materials in order to produce the powder.

15. A ceramic material comprising:
   a structure based on a system selected from the group consisting of Ni—Co—Mn—O, Ni—Mn—O, and Co—Mn—O; and
   at least one dopant selected from lanthanides,
   wherein the ceramic material has a negative temperature coefficient of an electrical resistance,
   wherein the dopant is contained in the ceramic material in an amount of up to and including 10 mol %, and
   wherein the ceramic material has a spinel structure of the general formula $AB_2O_4$,
   where:
   A is selected from the group consisting of Ni, Co, Mn, Mg, Sr, Zn, Ca, Zr, Cu and combinations thereof,
   B is selected from the group consisting of Mn, Co, Al, Fe, Ti and combinations thereof, and
   A comprises at least Ni and B comprises at least Mn, or A comprises at least Ni and B comprises at least Mn and Co, or A comprises at least Mn or Co and B comprises at least Co or Mn, wherein the dopant is disposed at a B position of the spinel structure.

16. A component comprising:
   a ceramic base element comprising a ceramic material, the ceramic material comprising:
      a structure based on a system selected from the group consisting of Ni—Co—Mn—O, Ni—Mn—O, and Co—Mn—O; and
      at least one dopant selected from lanthanides,
      wherein the ceramic material has a negative temperature coefficient of an electrical resistance; and
   at least two electrodes disposed on the ceramic base element,
   wherein the ceramic base element has a volume selected from a range of 0.03 $cm^3$ inclusive to 0.23 $cm^3$ inclusive, or
   wherein the ceramic base element has a resistance $R_{25}$ selected from a range of 2000Ω to 3000Ω and a B value selected from a range of 3500 K to 4300 K.

17. The component according to claim 16, wherein the system further contains at least one element selected from Al, Fe, Cu, Ti, Mg, and combinations thereof.

18. The component according to claim 16, wherein the ceramic material has a spinel structure.

19. The component according to claim 18,
   wherein the spinel structure has the general formula $AB_2O_4$,
   wherein A is selected from the group consisting of Ni, Co, Mn, Mg, Sr, Zn, Ca, Zr, Cu and combinations thereof,
   wherein B is selected from the group consisting of Mn, Co, Al, Fe, Ti and combinations thereof, and
   wherein A comprises at least Ni and B comprises at least Mn, or A comprises at least Ni and B comprises at least Mn and Co, or A comprises at least Mn or Co and B comprises at least Co or Mn.

20. The component according to claim 19, wherein the spinel structure is selected from the group consisting of $NiMn_2O_4$, $Ni^{2+}Mn^{3+}Co^{3+}O_4$, $MnCo_2O_4$, and $CoMn_2O_4$.

* * * * *

UNITED STATES PATENT AND TRADEMARK OFFICE
CERTIFICATE OF CORRECTION

Page 1 of 1

PATENT NO. : 10,961,159 B2
APPLICATION NO. : 16/326360
DATED : March 30, 2021
INVENTOR(S) : Christl Lisa Mead et al.

It is certified that error appears in the above-identified patent and that said Letters Patent is hereby corrected as shown below:

On the Title Page

Item (72) Inventors, Line 1, delete "St. Martin Island" and insert --St. Martin i. S.--.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*